US009662788B2

(12) United States Patent
Ishiguro

(10) Patent No.: US 9,662,788 B2
(45) Date of Patent: May 30, 2017

(54) COMMUNICATION DRAW-IN SYSTEM, COMMUNICATION DRAW-IN METHOD, AND COMMUNICATION DRAW-IN PROGRAM

(71) Applicant: Shin Ishiguro, Tokyo (JP)

(72) Inventor: Shin Ishiguro, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 14/373,684

(22) PCT Filed: Nov. 15, 2012

(86) PCT No.: PCT/JP2012/007325
§ 371 (c)(1),
(2) Date: Jul. 22, 2014

(87) PCT Pub. No.: WO2013/114493
PCT Pub. Date: Aug. 8, 2013

(65) Prior Publication Data
US 2015/0032254 A1   Jan. 29, 2015

(30) Foreign Application Priority Data

Feb. 3, 2012 (JP) .................................. 2012-022106

(51) Int. Cl.
B25J 9/16 (2006.01)
B25J 11/00 (2006.01)
B25J 13/08 (2006.01)

(52) U.S. Cl.
CPC .......... B25J 9/1602 (2013.01); B25J 11/0005 (2013.01); B25J 13/08 (2013.01); *Y10S 901/01* (2013.01); *Y10S 901/47* (2013.01)

(58) Field of Classification Search
CPC .... B25J 9/1602; B25J 11/0005; Y10S 901/01; Y10S 901/47
See application file for complete search history.

(56) References Cited

U.S. PATENT DOCUMENTS

| 8,010,231 B2* | 8/2011 | Sumida | G06N 3/008 700/253 |
| 2011/0085680 A1* | 4/2011 | Chen | G06Q 30/02 381/107 |

(Continued)

FOREIGN PATENT DOCUMENTS

| CN | 1304516 A | 7/2001 |
| CN | 1493379 A | 5/2004 |

(Continued)

OTHER PUBLICATIONS

International Search Report for PCT Application No. PCT/JP2012/007325, mailed on Dec. 25, 2012.

(Continued)

*Primary Examiner* — Khoi Tran
*Assistant Examiner* — Robert Nguyen

(57) ABSTRACT

A communication draw-in system that enables robot-human communication to start smoothly is provided. The communication draw-in system is a communication draw-in system provided in a robot that communicates with a target human, and includes: a human specifying unit 200 for specifying a position of the target human; a light source control unit 201 for moving light toward the specified position of the target human; a draw-in control unit 203 for instructing the robot to perform a draw-in operation for making the target human recognize a direction of the robot; and a human recognition specifying unit 204 for determining whether or not the target human has recognized the robot, wherein the robot is instructed to start communicating with the target human, in the case where the target human is determined to have recognized the robot.

7 Claims, 3 Drawing Sheets

(56) References Cited

U.S. PATENT DOCUMENTS

| | | | | |
|---|---|---|---|---|
| 2012/0130716 | A1* | 5/2012 | Kim | B25J 13/003 704/256.1 |
| 2012/0274646 | A1* | 11/2012 | Johnson | G06T 13/60 345/501 |
| 2013/0138499 | A1* | 5/2013 | Tu | G06Q 30/0241 705/14.41 |
| 2013/0345875 | A1* | 12/2013 | Brooks | B25J 9/0087 700/259 |
| 2015/0088310 | A1* | 3/2015 | Pinter | G06Q 50/22 700/253 |

FOREIGN PATENT DOCUMENTS

| | | |
|---|---|---|
| EP | 2068275 A2 | 6/2009 |
| JP | 2001224867 A | 8/2001 |
| JP | 2002-350555 A | 12/2002 |
| JP | 2003-326479 A | 11/2003 |
| JP | 2007118129 A | 5/2007 |
| JP | 2007242056 A | 9/2007 |
| JP | 2009-45692 A | 3/2009 |
| JP | 2009113190 A | 5/2009 |
| JP | 2009-123045 A | 6/2009 |
| JP | 2010-82714 A | 4/2010 |
| JP | 2011000656 A | 1/2011 |
| JP | 2011-227237 A | 11/2011 |

OTHER PUBLICATIONS

Chinese Office Action for CN Application No. 201280068866.5 issued on Apr. 3, 2015 with English Translation.
Japanese Office Action for JP Application No. 2013-556049 mailed on Aug. 18, 2015 with English Translation.
M. M. Hoque, T. Onuki, Y. Kobayashi, Y. Kuno, "Controlling human attention through robot's gaze behaviors", 2011 4th International Conference on Human System Interactions (HSI), IEEE, May 19, 2011, pp. 195-202.
Japanese Office Action for JP Application No. 2013-556049 mailed on Mar. 22, 2016.
Australian Examination Report of AU Application No. 2012368731 issued on Mar. 21, 2016.
Noriaki Mitsunaga et al,"Robovie-IV: A Communication Robot Interacting with People Daily in an Office", Proceedings of the 2006 IEEE/RSJ, International Conference on Intelligent Robots and Systems, Oct. 15, 2006, Beijing, China, pp. 5066-5072, XP031006935, ISBN: 978-1-4244-0258-8.
Extended European Search Report for EP Application No. EP12867118.7 dated Aug. 8, 2016.

* cited by examiner

| NUMBER OF TIMES \ OPERATION | OPERATION OF LIGHT | OPERATION OF ROBOT |
|---|---|---|
| 3 OR LESS | MOVE LIGHT SLOWLY | TURN TO TARGET HUMAN |
| 9 OR LESS | MOVE LIGHT RAPIDLY | WAVE TO TARGET HUMAN |
| 10 OR MORE | GIVE UP | OPERATION OF FINDING NEXT TARGET HUMAN |

COMMUNICATION DRAW-IN SYSTEM, COMMUNICATION DRAW-IN METHOD, AND COMMUNICATION DRAW-IN PROGRAM

This application is a National Stage Entry of PCT/JP2012/007325 filed on Nov. 15, 2012, which claims priority from Japanese Patent Application 2012-022106 filed on Feb. 3, 2012, the contents of all of which are incorporated herein by reference, in their entirety.

TECHNICAL FIELD

The present invention relates to a communication draw-in system used for a robot that communicates with humans.

BACKGROUND ART

Social needs for robots have been increasing, and robots that communicate with humans have been developed. To start communication such as interaction, a robot needs to have mutual understanding for starting the communication with a target human who the robot is to communicate with.

Robots capable of locomotion (hereafter referred to as "mobile robots"), such as a humanoid robot with two legs and a wheeled robot, have also been developed. The use of a mobile robot that approaches a human to communicate with him or her has a safety problem, as there is a possibility that the robot collides with an obstacle. To solve the safety problem, Patent Literature (PTL) 1 discloses a technique for improving safety by allowing a human to visually recognize a dangerous range that varies as the operation of a mobile robot changes.

For stationary robots, too, there are techniques for drawing in a target human to be communicated with by, for example, outputting signal sound to attract his or her attention or outputting sound to call his or her name.

CITATION LIST

Patent Literature

PTL 1: Japanese Patent Application Laid-Open No. 2009-123045

SUMMARY OF INVENTION

Technical Problem

However, when a robot tries to approach a target human to be communicated with according to the technique in PTL 1, the surrounding environment may obstruct the robot from approaching the target human. For example, the robot may be unable to approach the target human if there is an obstacle or the robot is far from the target human.

When a stationary robot calls attention by outputting signal sound or the like, it is difficult to attract the specific human's attention if, for example, someone other than the target human is around. Besides, the robot cannot call the target human's name if the robot does not know the name.

The present invention has an object of providing a communication draw-in system that enables robot-human communication to start smoothly.

Solution to Problem

A communication draw-in system according to the present invention is a communication draw-in system provided in a robot that communicates with a target human, the communication draw-in system including: a human specifying unit for specifying a position of the target human; a light source control unit for moving light toward the specified position of the target human; a draw-in control unit for instructing the robot to perform a draw-in operation for making the target human recognize a direction of the robot; and a human recognition specifying unit for determining whether or not the target human has recognized the robot, wherein the robot is instructed to start communicating with the target human, in the case where the target human is determined to have recognized the robot.

A communication draw-in method according to the present invention is a communication draw-in method in a robot that communicates with a target human, the communication draw-in method including: specifying a position of the target human; moving light toward the specified position of the target human; instructing the robot to perform a draw-in operation for making the target human recognize a direction of the robot; determining whether or not the target human has recognized the robot; and instructing the robot to start communicating with the target human, in the case where the target human is determined to have recognized the robot.

A communication draw-in program according to the present invention is a communication draw-in program for causing a computer to execute a communication draw-in process in a robot that communicates with a target human, the communication draw-in program causing the computer to execute: a human specifying process of specifying a position of the target human; a light source control process of moving light toward the specified position of the target human; a draw-in control process of instructing the robot to perform a draw-in operation for making the target human recognize a direction of the robot; a human recognition specifying process of determining whether or not the target human has recognized the robot; and a process of instructing the robot to start communicating with the target human, in the case where the target human is determined to have recognized the robot.

Advantageous Effects of Invention

According to the present invention, robot-human communication can start smoothly.

DESCRIPTION OF EMBODIMENT(S)

Exemplary Embodiment 1

Figure 1:
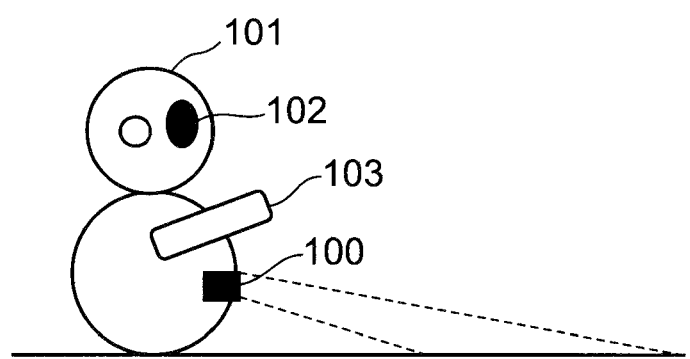
FIG. 1 It is a schematic diagram depicting the appearance of a robot using Exemplary Embodiment 1 of a communication draw-in system according to the present invention.

FIG. 1 is a schematic diagram depicting the appearance of a robot using Exemplary Embodiment 1 (first exemplary embodiment) of a communication draw-in system according to the present invention. The robot depicted in FIG. 1 has an appearance from which one expects the robot to perform communication, and includes a projection module 100, a head 101, a sensing module 102, and an arm 103.

The projection module 100 includes a light source, and can apply light or project an image onto a floor, a wall, or the like. The projection module 100 has a projection angle adjustable by machine control, and is capable of projection to a specific location.

The sensing module 102 specifies the locations of the light source and a target human (hereafter also referred to as "human") to be communicated with, and determines whether or not the target human is aware of light emitted from the light source. For example, the sensing module 102 can be realized by a camera, an infrared sensor, or the like.

The head 101 and the arm 103 can be driven using a motor, a server mechanism, etc. The head 101 is capable of an operation of nodding to the target human, as an example. The arm 103 is capable of an operation of beckoning to the target human, as an example.

Figure 2:
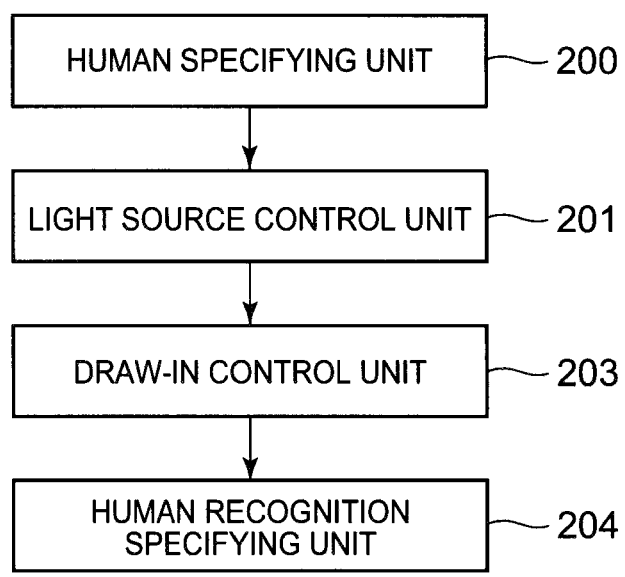
FIG. 2 It is a block diagram depicting the structure of Exemplary Embodiment 1 of the communication draw-in system according to the present invention.

FIG. 2 is a block diagram depicting the structure of Exemplary Embodiment 1 of the communication draw-in system according to the present invention. As depicted in FIG. 2, the communication draw-in system in this exemplary embodiment includes a human specifying unit 200, a light source control unit 201, a draw-in control unit 203, and a human recognition specifying unit 204.

The human specifying unit 200 detects human position and human movement through image recognition by a camera or the like, and specifies the position of the target human to be communicated with.

The light source control unit 201 decides, according to the specified position of the human, a path through which light emitted from the light source of the projection module 100 moves, and controls the light source so that light is applied along the path (e.g. changes the direction in which the light source emits light), to move the light (and the light emitting position).

The draw-in control unit 203 operates to make the target human recognize the direction of the robot. For example, the draw-in control unit 203 turns the head 101 of the robot to the target human, to make the target human recognize that the light is from the robot. The draw-in control unit 203 may also move the light in the direction of the robot. The draw-in control unit 203 may move the robot and the light together.

The human recognition specifying unit 204 determines whether or not the target human has recognized the robot. For example, the human recognition specifying unit 204 determines that the target human has recognized the light, in the case of determining from an image captured by a camera that the target human has turned to face the robot or moved in the direction of the robot. In the case where the human recognition specifying unit 204 determines that the target human has recognized the light, the communication draw-in system instructs the robot to start communication with the target human. In the case where the human recognition specifying unit 204 determines that the target human has not recognized the light, the communication draw-in system repeats the operation of the draw-in control unit 203 to make the target human recognize the direction of the robot.

The human specifying unit 200, the light source control unit 201, the draw-in control unit 203, and the human recognition specifying unit 204 included in the communication draw-in system in this exemplary embodiment can be realized by a CPU that executes processes based on a program.

Figure 3:
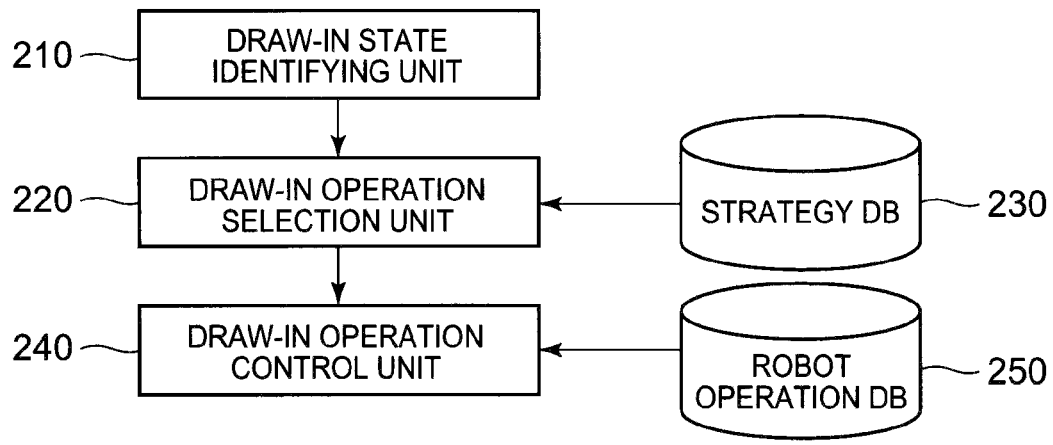
FIG. 3 It is a block diagram depicting the structure of a draw-in control unit.

FIG. 3 is a block diagram depicting the structure of the draw-in control unit 203. The draw-in control unit 203 includes a draw-in state identifying unit 210, a draw-in operation selection unit 220, a strategy database (DB) 230, a draw-in operation control unit 240, and a robot operation database (DB) 250. Each draw-in operation of the robot stored in the strategy DB is a motion similar to that made by humans to prompt communication. For example, the draw-in operation is an operation of staring at the target human or waving to the target human according to the movement of the light (the movement of the light irradiation position), to make the target human recognize the robot.

The draw-in state identifying unit 210 acquires states such as how many times the robot has performed a draw-in operation, which draw-in operation the robot has performed, and whether or not the target human has recognized the robot.

The draw-in operation selection unit 220 selects an operation to be performed by the robot based on the states regarding draw-in and the like identified by the draw-in state identifying unit 210, using the strategy DB 230 in which draw-in operation strategies are stored beforehand.

The draw-in operation control unit 240 controls the robot to perform the operation of the robot selected by the draw-in operation selection unit 220. In detail, the draw-in operation control unit 240 acquires a moving pattern for the light, a machine control script for the robot, and the like from the robot operation DB 250, and causes the robot to execute the script.

Figure 4:
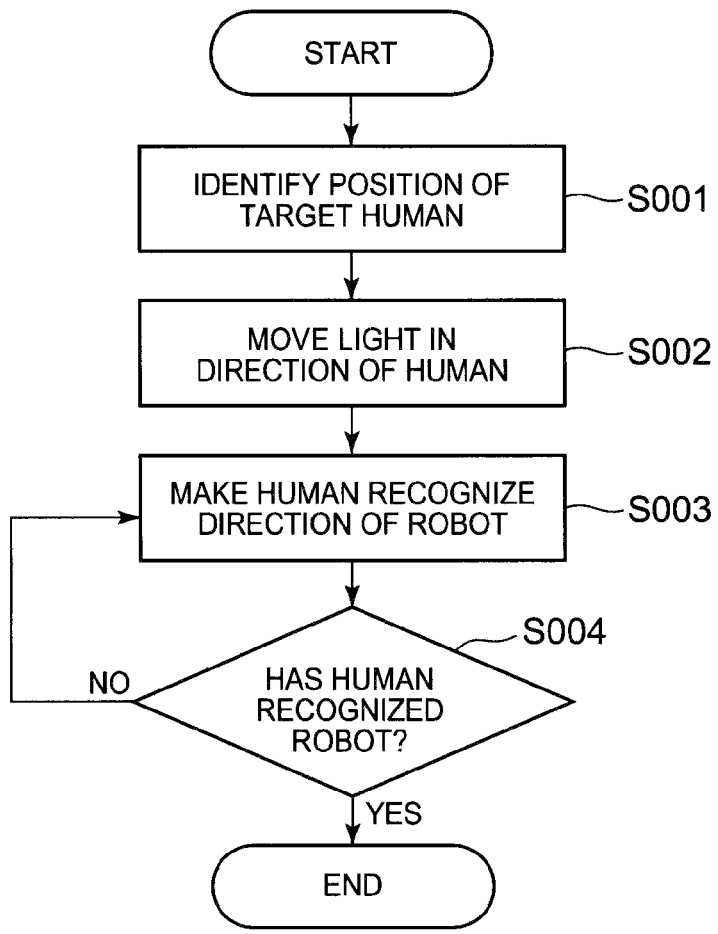
FIG. 4 It is a flowchart depicting the operation of Exemplary Embodiments 1 and 2 of the communication draw-in system according to the present invention.

The following describes the operation of the communication draw-in system in this exemplary embodiment. FIG. 4 is a flowchart depicting the operation of Exemplary Embodiment 1 of the communication draw-in system according to the present invention.

First, the human specifying unit 200 identifies the position of the target human (step S001). In detail, to specify the position of the human, the human specifying unit 200 performs image recognition using the sensing module 102 realized by a stereo camera as an example, and recognizes the distance and angle between the target human and the robot. Sensing means other than for image recognition, such as an ultrasonic or infrared distance sensor or a laser range sensor, may instead be used as the sensing module 102.

For example in the case where a laser range sensor is used, the human specifying unit 200 masks obstacles other than humans beforehand, captures any moving object as a human through sensing at regular intervals, and detects its angle and distance from the robot and its moving direction. The human specifying unit 200 sets, for instance, a human closest to the robot as the target human to be communicated with. In the case where the communication is intended for children, for example, the human specifying unit 200 determines whether or not the human is a child through sensing of the height and the like, and sets the child as the target human.

After the target human is set, the light source control unit 201 moves the light in the direction of the set target human (step S002). The height of the projection module 100 depicted in FIG. 1 is set manually or using a distance sensor or the like, beforehand. Since the distance from the robot has been detected by the human specifying unit 200, the light source control unit 201 calculates the projection angle of the projection module 100, based on the detected distance and the distance between the projection module 100 and the sensing module 102. The light source control unit 201 projects light from the projection module 100, operates the projection module 100 to have the calculated projection angle, and moves the light.

In the case where the movement of the target human is fast, the light source control unit 201 estimates the destination from the moving speed and distance, and controls the projection module 100 to project light to the location estimated while taking the driving speed of the projection module 100 into account. The projection module 100 may be realized by a light source with a narrow radiation range such as a laser pointer. Alternatively, a projector capable of wide-range projection may be used as the projection module 100.

Next, the draw-in control unit 203 instructs the robot to perform a draw-in operation, to make the target human recognize the direction of the robot and guide the target human to communicate with the robot (step S003). The draw-in control unit 203 drives the machine of the robot, upon arrival of light at the target human by the operation in step S002. The draw-in operation performed by the robot is a motion similar to that made by humans to prompt communication. For example, the draw-in operation is an operation of staring at the target human or waving to the target human according to the movement of the light, to make the target human recognize the robot. The robot may also include draw-in means such as a light emitting diode (LED) or a speaker other than the projection module 100, where the draw-in means emits light or outputs sound.

The operation of the draw-in control unit 203 is described in detail below. First, the draw-in control unit 203 analyzes draw-in states. The draw-in state identifying unit 210 acquires states such as how many times the robot has performed draw-in, which draw-in the robot has performed, and whether or not the human recognition specifying unit 204 has found some kind of reaction.

The draw-in operation selection unit 220 sets an operation to be performed by the robot based on the states regarding draw-in and the like identified by the draw-in state identifying unit 210, using the strategy DB 230 in which draw-in operation strategies are stored beforehand. When selecting the operation of the robot, the draw-in operation selection unit 220 selects a draw-in operation strategy according to content, time period, and the like. For example, in a time period during which many humans pass in front of the robot, the draw-in operation selection unit 220 selects, in the case where the robot has failed to draw in the target human, a strategy of making an approach to the next human.

Figures 5, 6:
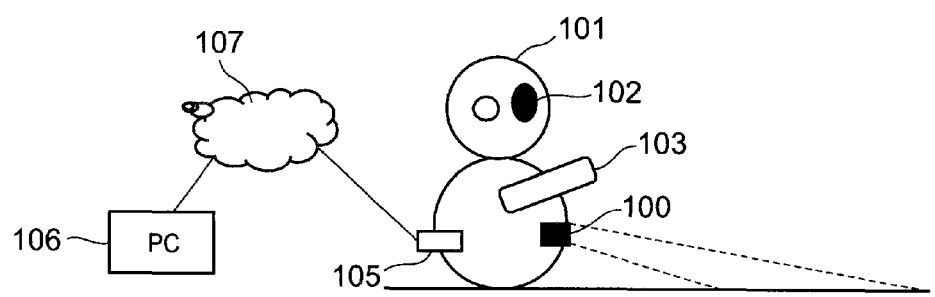
FIG. 5 It is an explanatory diagram depicting an example of draw-in operation strategies stored in a strategy DB.
FIG. 6 It is a schematic diagram depicting the appearance of a robot using Exemplary Embodiment 2 of the communication draw-in system according to the present invention.

FIG. 5 is an explanatory diagram depicting an example of the draw-in operation strategies stored in the strategy DB 230. The strategies depicted in FIG. 5 represent an example of changing the draw-in operation depending on the number of times draw-in is performed. In detail, regarding the operation of the light, the draw-in operation control unit 240 moves the light slowly in the case where the number of times draw-in is performed is 3 or less, moves the light rapidly in the case where the number of times draw-in is performed is 9 or less, and gives up draw-in in the case where the number of times draw-in is performed reaches 10. Regarding the operation of the robot, the draw-in operation control unit 240 operates the head 101 to turn to the target human in the case where the number of times draw-in is performed is 3 or less, operates the arm 103 to wave to the target human in the case where the number of times draw-in is performed is 9 or less, and operates the robot to find the next target human in the case where the number of times draw-in is performed reaches 10. The draw-in operation control unit 240 may operate both the light and the robot, or operate only one of the light and the robot.

The draw-in operation control unit 240 controls the robot to perform the operation of the robot selected by the draw-in operation selection unit 220. In detail, the draw-in operation control unit 240 acquires a moving pattern for the light, a machine control script for the robot, and the like from the operation DB 250, and causes the robot to perform the operation.

Other examples of the draw-in operation controlled by the draw-in control unit 203 are described below. As an example, in the case where a module capable of image projection, such as a projector, is used as the projection module 100, the draw-in control unit 203 projects an arrow to indicate the direction of the robot, or gradually changes the color of an image. As another example, in the case where the robot includes a speaker, the draw-in control unit 203 may output speech from the speaker while changing the speech. As another example, the draw-in control unit 203 may display a computer graphics (CG) character of the robot, with information being included in the image. As another example, in the case where a system capable of aerial projection is used as the projection module 100, the draw-in control unit 203 may aerially project an avatar of the robot and produce such display that brings the avatar closer to the target human.

The above-mentioned other examples of the draw-in operation are realized by setting options such as "gradually change color" and "change speech" in the strategy DB 230 beforehand as in the example depicted in FIG. 5, and storing scripts and the like for performing these operations in the robot operation DB 250 beforehand. The draw-in operation control unit 240 controls the robot to perform the operation of the robot selected by the draw-in operation selection unit 220, based on the script stored in the robot operation DB 250.

After the draw-in operation in step S003, the human recognition specifying unit 204 determines whether or not the target human has noticed the robot, that is, whether or not communication draw-in is successful (step S004). In the case where the human recognition specifying unit 204 determines that the human has not recognized the robot, the process in step S003 is repeated.

The operation of the human recognition specifying unit 204 in step S004 is described in detail below. In the case where a camera or the like is used, the human recognition specifying unit 204 performs a face direction determination process or a face detection process, and scores whether or not the target human is facing the robot. In the case where a device other than a camera, such as a laser range sensor, is used as the sensing module 102, the human recognition specifying unit 204 scores whether or not the target human is facing the robot, based on information indicating, for example, whether or not the distance between the target human and the robot is reduced. The human recognition specifying unit 204 determines that the draw-in operation is successful, in the case where the score exceeds a threshold. The communication draw-in system then causes the robot to perform an operation on success, such as nodding to the target human or beckoning to the target human, and instructs the robot to start communication with the target human such as interaction or information provision. In the case where the score is low, the human recognition specifying unit 204 determines that the human has not recognized the robot, and the process in step S003 is repeated.

With the communication draw-in system in this exemplary embodiment, the robot does not physically approach the target human to be communicated with, but approaches the target human in a pseudo manner using light. The communication draw-in system in this exemplary embodiment thus enables communication to start smoothly even in the case where the robot is far from the target human, the robot is unable to approach the target human due to an obstacle, or the robot has no means of locomotion.

The communication draw-in system in this exemplary embodiment can also draw in the target human even in the case where, for example, the name of the target human is unknown, another sound source is present, the area is large, or from where voice is coming cannot be specified, unlike the method of calling to the target human using only sound.

Exemplary Embodiment 2

The following describes an example of using remote communication by an operator, as another exemplary embodiment of the communication draw-in system according to the present invention. In the following, the description of the same structures and operations as those in Exemplary Embodiment 1 is omitted. FIG. 6 is a schematic diagram depicting the appearance of a robot using Exemplary Embodiment 2 (second exemplary embodiment) of the communication draw-in system according to the present invention. The robot depicted in FIG. 6 includes a communication module 105 in addition to the structure of the robot depicted in FIG. 1, and is connected to a personal computer (PC) 106 via a network 107.

The communication module 105 is a communication interface capable of network connection. The network 107 is a wireless LAN as an example. The PC 106 is not a limitation of the type of device, and any device connectable to the network may be used. Examples of such a device include a mobile phone and a tablet. The sensing module 102 is a camera as an example, and an image captured by the sensing module 102 is transmitted from the communication module 105 to the PC 106 via the network 107. The operator can remotely operate the machine of the robot, while viewing the sensing data of the robot displayed on the PC 106.

In this exemplary embodiment, the operations performed by the human specifying unit 200, the light source control unit 201, the draw-in control unit 203, and the human recognition specifying unit 204 in Exemplary Embodiment 1 are manually performed by the operator operating the PC 106. The following describes an example of the operation of this exemplary embodiment, with reference to the flowchart in FIG. 4.

When the operator wants to communicate with a human passing in front of the robot, the operator identifies the position of the target human (step S001). In detail, the operator identifies the position of the target human from a camera image displayed on the screen of the PC 106.

The operator then moves the light emitted from the projection module 100, to prompt the target human to communicate with the robot (step S002). In detail, the operator performs a pointing operation such as clicking on the location of the target human or the destination of the target human assumed from the movement of the target human, on the screen. The light emitted from the projection module 100 moves to the target on the screen, according the pointing operation such as clicking Here, the control angle of the projection module 100 is set based on the direction of the robot and the position of the target.

Regarding the draw-in operation, too, the operator controls the light and the machine using the PC 106, thus manually performing the operation performed by the draw-in control unit 203 in Exemplary Embodiment 1 (step S003).

In the case where the operator determines from a camera image that the target human has turned to the robot (step S004: YES), the communication starts. In the case where the operator determines that the target human has not turned to the robot (step S004: NO), the draw-in operation in step S003 is repeated.

Though the operator can manually perform all operations in steps S001 to S004, part of the operations may be automatically performed using the components depicted in FIG. 2 as in Exemplary Embodiment 1. For example, the operation in step S003 may be performed by the draw-in control unit 203 based on a preset strategy as in Exemplary Embodiment 1, while the other operations are manually performed by the operator.

With the communication draw-in system in this exemplary embodiment, the operator can manually perform the draw-in operation and the like, which increases the freedom in operating the robot. This enables communication to start smoothly, even in a situation where it is difficult to draw in the target human by system control.

In the above exemplary embodiments, a communication draw-in system as defined in each of the following (1) to (3) is disclosed, too.

(1) A communication draw-in system provided in a robot that communicates with a target human, the communication draw-in system including: a human specifying unit (e.g. the human specifying unit 200) for specifying a position of the target human; a light source control unit (e.g. the light source control unit 201) for moving light toward the specified position of the target human; a draw-in control unit (e.g. the draw-in control unit 203) for instructing the robot to perform a draw-in operation for making the target human recognize a direction of the robot; and a human recognition specifying unit (e.g. the human recognition specifying unit 204) for determining whether or not the target human has recognized the robot, wherein the robot is instructed to start communicating with the target human, in the case where the target human is determined to have recognized the robot.

(2) In the communication draw-in system, the draw-in control unit may instruct to output sound or light, as the draw-in operation.

(3) In the communication draw-in system, the draw-in control unit may instruct to perform an operation of the robot per se, as the draw-in operation.

This application claims priority based on Japanese Patent Application No. 2012-22106 filed on Feb. 3, 2012, the disclosure of which is incorporated herein in its entirety.

Though the present invention has been described with reference to the above exemplary embodiments, the present invention is not limited to the above exemplary embodiments. Various changes understandable by those skilled in the art can be made to the structures and details of the present invention within the scope of the present invention.

INDUSTRIAL APPLICABILITY

The present invention is applicable to advertisements, information provision systems, or telepresence robots.

REFERENCE SIGNS LIST 100 projection module
101 head
102 sensing module
103 arm
105 communication module
106 personal computer
107 network
200 human specifying unit
201 light source control unit 203 control unit
204 human recognition specifying unit
210 state identifying unit
220 operation selection unit
240 operation control unit
250 operation database
230 strategy DB
250 robot operation DB

What is claimed is:

1. A communication draw-in method in a robot that communicates with a target human, the communication draw-in method comprising:
   specifying a position of the target human;
   moving light toward the specified position of the target human;
   instructing the robot to perform a draw-in operation for making the target human recognize a direction of the robot;
   determining whether or not the target human has recognized the robot; and
   instructing the robot to start communicating with the target human, in the case where the target human is determined to have recognized the robot,
   wherein the draw-in operation is an operation of directing line of sight to the target human according to the movement of the light irradiation position or moving a body of the robot according to the movement of the light irradiation position.

2. The communication draw-in method according to claim 1, wherein the draw-in operation is an operation of directing line of sight to the target human according to the movement of the light irradiation position or waving to the target human according to the movement of the light irradiation position.

3. A non-transitory computer-readable recording medium in which a communication draw-in program is recorded, the communication draw-in program causing a computer to execute a communication draw-in process in a robot that communicates with a target human, the communication draw-in program causing the computer to execute:
   a human specifying process of specifying a position of the target human;
   a light source control process of moving light toward the specified position of the target human;
   a draw-in control process of instructing the robot to perform a draw-in operation for making the target human recognize a direction of the robot;
   a human recognition specifying process of determining whether or not the target human has recognized the robot; and
   a process of instructing the robot to start communicating with the target human, in the case where the target human is determined to have recognized the robot,
   wherein the draw-in operation is an operation of directing line of sight to the target human according to the movement of the light irradiation position or moving a body of the robot according to the movement of the light irradiation position.

4. The non-transitory computer-readable recording medium in which the communication draw-in program is recorded according to claim 3, wherein the draw-in operation is an operation of directing line of sight to the target human according to the movement of the light irradiation position or waving to the target human according to the movement of the light irradiation position.

5. A communication draw-in system provided in a robot that communicates with a target human, the communication draw-in system comprising:
   a human specifying unit implemented at least by a hardware including a processor and that specifies a position of the target human;
   a light source control unit implemented at least by a hardware including a processor and that moves light toward the specified position of the target human;
   a draw-in control unit implemented at least by a hardware including a processor and that instructs the robot to perform a draw-in operation for making the target human recognize a direction of the robot; and
   a human recognition specifying unit implemented at least by a hardware including a processor and that determines whether or not the target human has recognized the robot,
   wherein the robot is instructed to start communicating with the target human, in the case where the target human is determined to have recognized the robot,
   wherein the draw-in operation is an operation of directing line of sight to the target human according to the movement of the light irradiation position or moving a body of the robot according to the movement of the light irradiation position.

6. The communication draw-in system according to claim 5, wherein the draw-in control unit instructs to output sound or light, as the draw-in operation.

7. The communication draw-in system according to claim 5, wherein the draw-in operation is an operation of directing line of sight to the target human according to the movement of the light irradiation position or waving to the target human according to the movement of the light irradiation position.

* * * * *